United States Patent [19]
Looney

[11] Patent Number: 5,125,221
[45] Date of Patent: Jun. 30, 1992

[54] GRAIN TANK COVER APPARATUS

[75] Inventor: Joe E. Looney, Proctor, Ark.

[73] Assignee: Looney Combine Covers, Inc., Proctor, Ark.

[21] Appl. No.: 706,178

[22] Filed: May 28, 1991

Related U.S. Application Data

[63] Continuation-in-part of Ser. No. 584,039, Sep. 18, 1990, abandoned.

[51] Int. Cl.⁵ .............................................. B60J 7/02
[52] U.S. Cl. ........................................ 56/1; 296/100; 460/150
[58] Field of Search ................. 56/1, 2, 324; 296/100; 460/150

[56] References Cited

U.S. PATENT DOCUMENTS

| | | | |
|---|---|---|---|
| 506,444 | 10/1893 | Sachse | 460/150 |
| 3,024,063 | 3/1962 | Robinson | 296/100 |
| 3,669,124 | 6/1972 | Pecone et al. | 460/150 |
| 4,756,571 | 7/1988 | Lake | 296/100 |
| 4,813,735 | 3/1989 | Avitable | 296/100 |

Primary Examiner—Thuy M. Bui
Attorney, Agent, or Firm—Walker & McKenzie

[57] ABSTRACT

A cover apparatus for use with a combine harvester of the type including a grain tank having an opened top. The cover apparatus includes a cover for covering the opened top of the grain tank, the cover having a top portion for being positioned over the top portion of the grain tank; attachment structure for attaching the cover to the combine harvester, and a bow for extending across said opened top of the grain tank and for supporting the top portion of the cover.

19 Claims, 4 Drawing Sheets

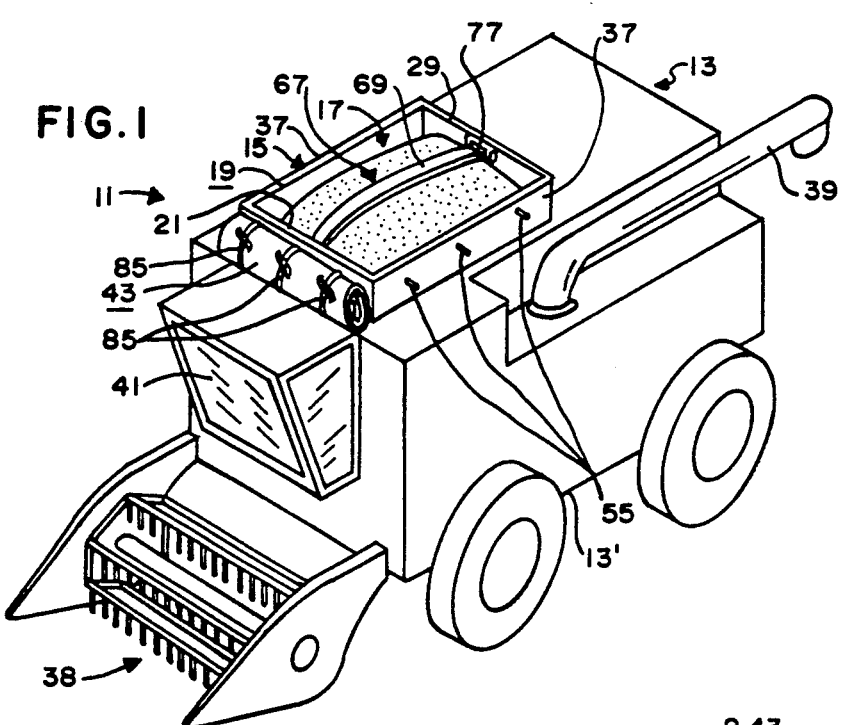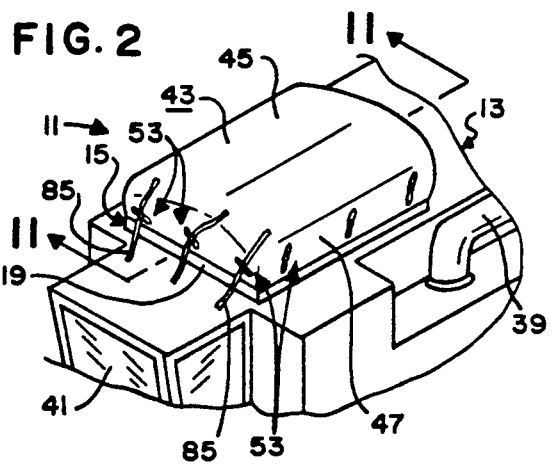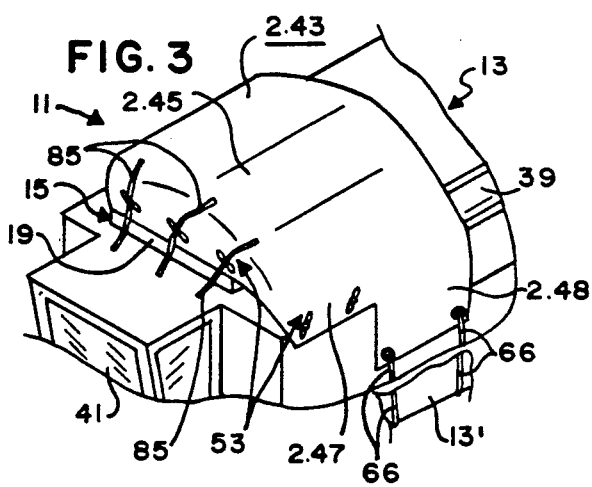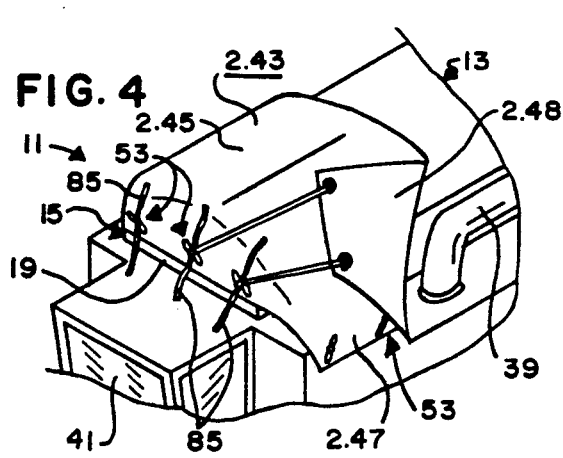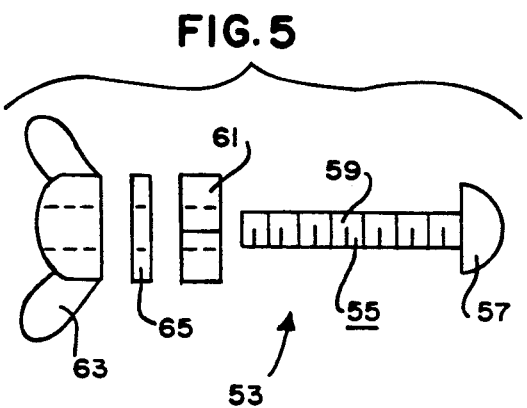

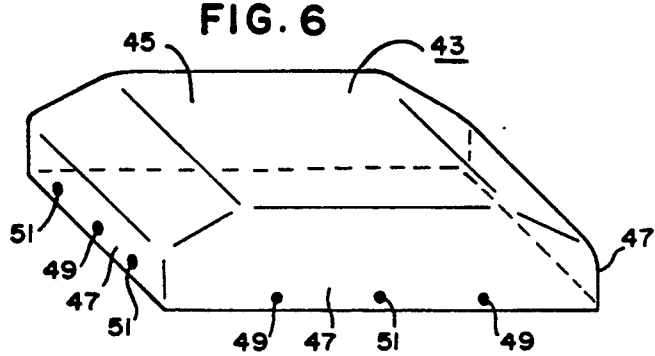
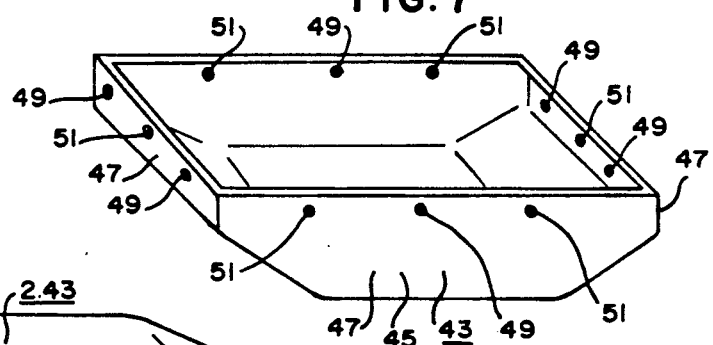
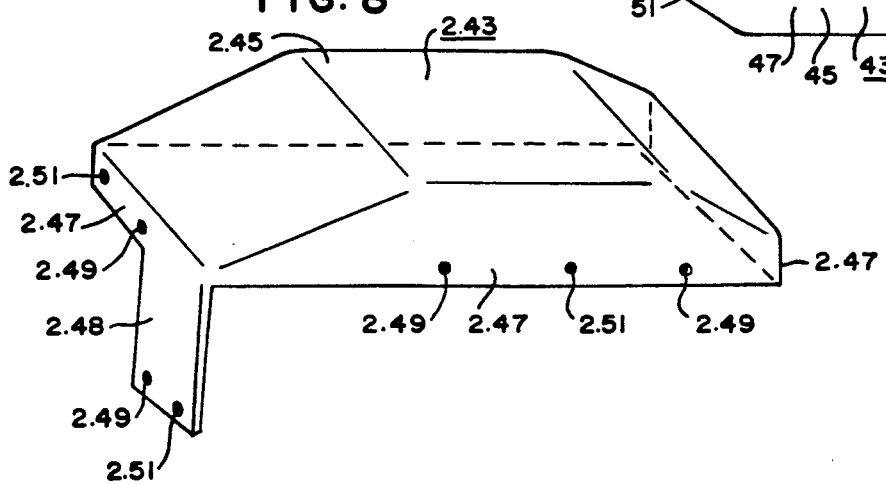
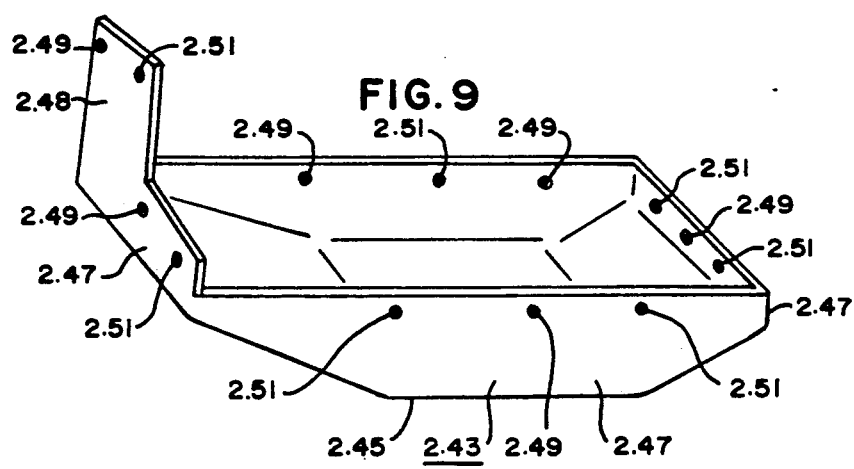

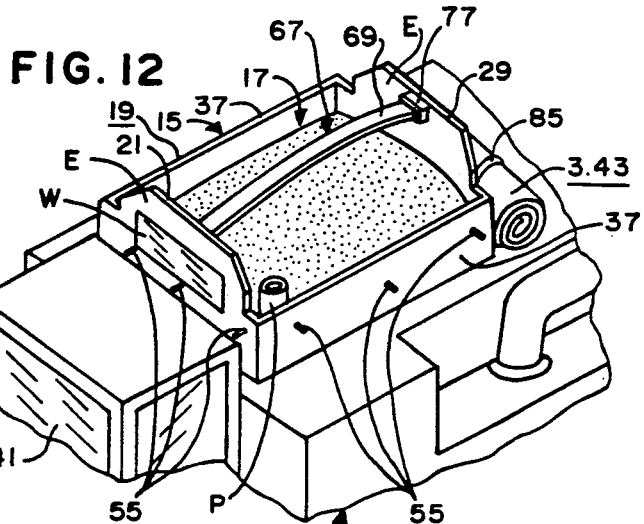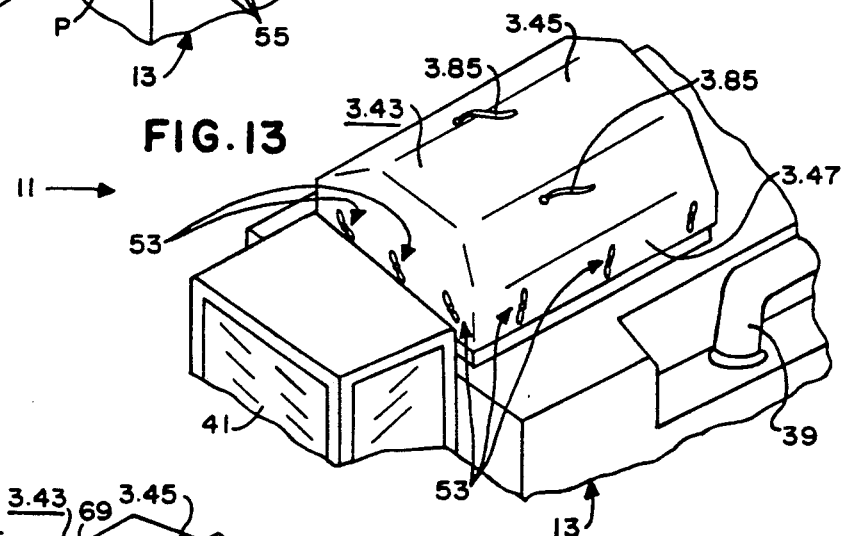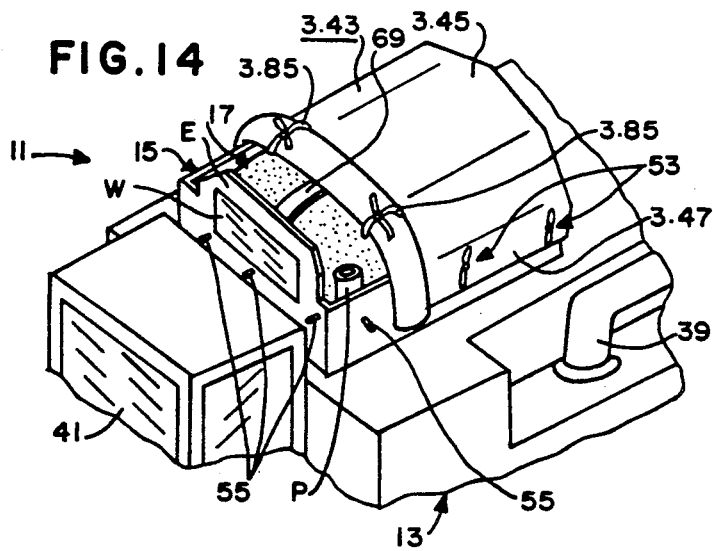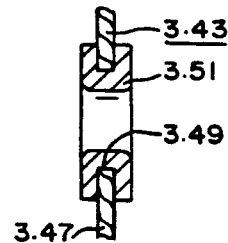

GRAIN TANK COVER APPARATUS

CROSS-REFERENCE TO RELATED APPLICATION

This is a continuation-in-part of my application, Ser. No. 07/584,039, filed Sep. 18, 1990, now abandoned, entitled "GRAIN TANK COVER APPARATUS."

BACKGROUND OF THE INVENTION

1. Field of the Invention

The present invention relates, in general, to a means for covering the top of a grain tank of a grain combine harvester.

2. Information Disclosure Statement

Grains, such as wheat, oats, and the like, are commonly harvested using a self-propelled combine harvester. Such a harvester typically includes a body supported by wheels, grain pickup means mounted on the front of the body for picking up and stripping the grain, an open-top grain tank located on the body for receiving grain from the grain pickup means and for holding the grain, and a grain unloading auger means for conveying grain from the grain tank into a truck, grain bin, or the like.

One long standing problem with such harvesters is the damage water can do to grain stored within the grain tank, and to various mechanical components within the grain tank. For example, if rain falls in grain stored within the grain tank, the harvested grain can germinate or otherwise spoil and reduce the quality and value thereof. Common practice when harvesting grain from large fields is to harvest grain until the grain tank is full, unload the grain from the grain tank into a truck in the field, and continue harvesting grain while the truck takes the previous load to a grain bin or the like and returns to the field. However, if there is a likelihood of rain between the time the truck takes one load to the grain bin or the like and the time the truck returns, the prudent action would be to wait until the truck returns before harvesting grain. Otherwise, the grain being harvested could be ruined if it rains before the grain can be unloaded into the truck, etc. Further, because of the harm water can cause the harvested grain within the grain tank, the common practice is to not harvest grain while it is raining. In fact, since sometimes as much as five bushels of harvested grain remains in the grain tank when the grain is merely transferred from the grain tank to a truck and because of the harm rain entering the grain tank can do to the mechanical components of the combine harvester, it is preferred that the harvester be moved into a barn or the like anytime there is a possibility of rain. While such courses are often the prudent action, the "window" for harvesting grain from certain fields or the like is often controlled by factors in addition to the likelihood of rain. Thus, the grain may rot in the field if not harvested within a certain period of time, the combine harvester may be needed at other fields, no barn or other shelter may be available, etc.

A preliminary patentability search conducted in class 460, subclasses 23, 119 and 150, and class 150, subclasses 57 and 166 produced the following patents which may relate to the present invention: Sachse, U.S. Pat. No. 506,444; Robinson, U.S. Pat. No. 3,024,063; and De Coene et al., U.S. Pat. No. 3,669,124. Sachse discloses a pivotal hood for covering a portion of the thrashing cylinder of a thrashing machine to allow the size of the throat or mouth of the thrashing machine to be adjusted depending on the character of the stock being thrashed. Robinson discloses a cover for an open top truck body, the cover including front and rear U-shaped brackets mounted on the front and rear of the truck body and extending across the open top of the truck body, and a tarpaulin slidably mounted on the brackets with one side thereof fixedly attached to the truck body and with the other side thereof slidable along the brackets to allow the tarpaulin to be slid between opened and closed positions. De Coene et al. discloses an anti-dust device for a combine and includes a plate mounted between the feeder housing and the threshing cylinder of the combine to control the internal flow of air in the combine.

There is nothing in the prior art that discloses or suggests the present invention. For example, nothing in the prior art discloses or suggests a cover apparatus for use with a combine harvester of the type including a grain tank having an opened top, the cover apparatus including cover means for covering the opened top of the grain tank, the cover means having a top portion for being positioned over the opened top of the grain tank; attachment means for attaching the cover means to the combine harvester; and bow means for extending across the opened top of the grain tank and for supporting the top portion of the cover means.

SUMMARY OF THE INVENTION

The present invention is directed toward providing means to protect grain in the grain tank of a self-propelled combine harvester. The concept of the present invention is to cover the opened top of the grain tank of a combine harvester to prevent rain and the like from falling into the grain held within the grain tank.

The cover apparatus of the present invention includes, in general, cover means for covering the opened top of a grain tank of a combine harvester, the cover means having a top portion for being positioned over the opened top of the grain tank; attachment means for attaching the cover means to the combine harvester; and bow means for extending across the opened top of the grain tank and for supporting the top portion of the cover means.

BRIEF DESCRIPTION OF THE DRAWINGS

FIG. 1 is a perspective view of the grain tank cover apparatus of the present invention with a first embodiment of the cover means thereof shown in an opened position and shown attached to a combine harvester with portions of the combine harvester shown diagrammatically.

FIG. 2 is a perspective view of the grain tank cover apparatus of FIG. 1 with the cover means thereof shown in a closed position and with a portion of the combine harvester omitted for clarity.

FIG. 3 is a perspective view of the grain tank cover apparatus of the present invention with a second embodiment of the cover means thereof shown in a closed position and shown attached to a combine harvester with a portion of the combine harvester omitted for clarity.

FIG. 4 is a perspective view of the grain tank cover apparatus of FIG. 3 with the cover means shown in a partially opened position.

FIG. 5 is an exploded view of an attachment means of the grain tank cover apparatus of the present invention.

FIG. 6 is a top perspective view of the first embodiment of the cover means of the grain tank cover apparatus of the present invention.

FIG. 7 is a bottom perspective view of the cover means of FIG. 6.

FIG. 8 is a top perspective view of the second embodiment of the cover means of the grain tank cover apparatus of the present invention.

FIG. 9 is a bottom perspective view of the cover means of FIG. 8.

FIG. 12 is a perspective view of the grain tank cover apparatus of the present invention with a third embodiment of the cover means thereof shown in a fully opened position and shown attached to a combine harvester with a portion of the combine harvester omitted for clarity.

FIG. 13 is a perspective view of the grain tank cover apparatus of FIG. 12 with the cover means thereof shown in a fully closed position and with a portion of the combine harvester omitted for clarity.

FIG. 14 is a perspective view of the grain tank cover apparatus of FIG. 12 with the cover means thereof shown in a partially opened, partially closed position and with a portion of the combine harvester omitted for clarity.

FIG. 15 is an enlarged sectional view of a portion of the cover means of the grain tank cover apparatus of FIG. 12.

DESCRIPTION OF THE PREFERRED EMBODIMENT

Figure 10:
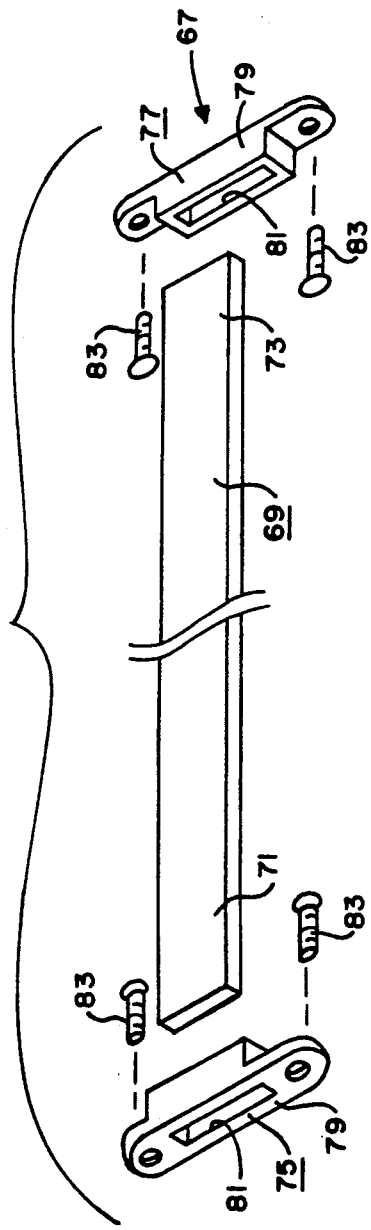
FIG. 10 is a perspective view of a bow means of the grain tank cover apparatus of the present invention.

The preferred embodiment of the cover apparatus 11 of the present invention is for use with a combine harvester 13 of the type including a grain tank 15 having an opened top 17. The combine harvester 13 may be of various specific models and may be manufactured by any of a number of well-known companies. Each model of combine harvester 13 may be constructed in a slightly different design, etc., as will now be apparent to those skilled in the art. However, the grain tank 15 of the combine harvester 13 normally includes an extension wall 19 extending upward from the top of the main body thereof for defining the opened top 17. The extension wall 19 thus forms a rim or lip around the opened top 17 (see, in general, FIG. 1). The extension wall 19 of the grain tank 15 preferably includes a front or first wall member 21 having an exterior side 23, an interior side 25, and a top end 27. The extension wall 19 of the grain tank 15 preferably includes a rear or second wall member 29 spaced from and positioned opposite the first wall member 21 and having an exterior side 31, an interior side 33, and a top end 35. The extension wall 19 also preferably includes a pair of spaced apart side wall members 37 extending between and joining the ends of each wall member 21, 29 as clearly shown in FIG. 1. The combine harvester 13 typically includes grain pickup means 38 (e.g., a cutter bar and pickup reel assembly, etc.), a grain unloading auger means 39 for removing grain from the grain tank 15, and a cab 41 including various controls for the operator of the combine harvester 13, etc., as will now be apparent to those skilled in the art.

The cover apparatus 11 includes cover means for covering the opened top 17 of the grain tank 15. The specific shape and size of the cover means will vary depending on the specific model of combine harvester 13 used, etc., as will now be apparent to those skilled in the art.

A first embodiment of the cover means is shown in FIGS. 2, 6 and 7 and identified by the numeral 43. The cover means 43 preferably includes a top portion 45 for being positioned over the opened top 17 of the grain tank 15 and preferably includes side portions 47 for being positioned over at least a portion of the extension wall 19 of the grain tank 15. The cover means 43 is preferably constructed out of a flexible 18 ounce per square yard vinyl coated nylon fabric that can be cut and sewn into an opened bottom, generally box-shaped member substantially as shown in FIGS. 6 and 7. The seams are preferably welded or otherwise made waterproof as will now be apparent to those skilled in the art. The outer ends of the front and back side portions 47 may be tapered to cause the outer edges of the top portion 45 to slope downward and thus aid water run-off, etc., as will now be apparent to those skilled in the art. The lower edge of each side portion 47 is preferably folded back and hemmed using double stitching to strengthen the edges of the cover means 43 as will now be apparent to those skilled in the art. Apertures 49 are preferably provided through the side portions 47 for use in attaching the cover means 43 to the combine harvester 13 in a manner which will hereinafter become apparent. More specifically, each side portion 47 preferably has three spaced apart apertures 49 through the lower edge or hem thereof. A grommet 51 is preferably attached to the cover means 43 about each aperture 49 for reinforcing the aperture 49, etc., as will now be apparent to those skilled in the art.

A second embodiment of the cover means is shown in FIGS. 3, 4, 8 and 9 and identified by the numeral 2.43. The cover means 2.43 preferably includes a top portion 2.45 for being positioned over the opened top 17 of the grain tank 15 and preferably includes side portions 2.47 for being positioned over at least a portion of the extension wall 19 of the grain tank 15. At least one of the side portions 2.47 of the cover means 2.43 preferably includes an elongated flap 2.48 for extending over a portion of the combine harvester 13 adjacent the grain tank 15 as shown in FIG. 3. The cover means 2.43 is preferably constructed out of a flexible 18 ounce per square yard vinyl coated nylon fabric that can be cut and sewn into an opened bottom, generally box-shaped member substantially as shown in FIGS. 8 and 9. The seams are preferably welded or otherwise made waterproof as will now be apparent to those skilled in the art. The outer ends of the front and back side portions 2.47 may be tapered to cause the outer edges of the top portion 2.45 to slope downward and thus aid water run-off, etc., as will now be apparent to those skilled in the art. The lower edge of each side portion 2.47 is preferably folded back and hemmed using double stitching to strengthen the edges of the cover means 2.43 as will now be apparent to those skilled in the art. Apertures 2.49 are preferably provided through the side portions 2.47 for use in attaching the cover means 2.43 to the combine harvester 13 in a manner which will hereinafter become apparent. More specifically, each side portion 2.47 preferably has a plurality of spaced apart apertures 2.49 through the lower edge or hem thereof as clearly shown in FIG. 9. A grommet 2.51 is preferably attached to the cover means 2.43 about each aperture 2.49 for reinforcing the aperture 2.49, etc., as will now be apparent to those skilled in the art.

A third embodiment of the cover means is shown in FIGS. 12, 13, 14 and 15 and identified by the numeral 3.43. The cover means 3.43 preferably includes a top portion 3.45 for being positioned over the opened top 17 of the grain tank 15 and preferably includes side portions 3.47 for being positioned over at least a portion of the extension wall 19 of the grain tank 15. The cover means 3.43 is preferably constructed out of a flexible 18 ounce per square yard vinyl coated nylon fabric that can be cut and sewn into an opened bottom, generally box-shaped member substantially similar to the cover means 43 shown in FIGS. 6 and 7. The seams are preferably welded or otherwise made waterproof as will now be apparent to those skilled in the art. The outer ends of the front and back side portions 3.47 may be tapered to cause the outer edges of the top portion 3.45 to slope downward and thus aid water run-off, etc., as will now be apparent to those skilled in the art. The lower edge of each side portion 3.47 is preferably folded back and hemmed using double stitching to strengthen the edges of the cover means 3.43 as will now be apparent to those skilled in the art. Apertures 3.49 are preferably provided through the side portions 3.47 for use in attaching the cover means 3.43 to the combine harvester 13 in a manner which will hereinafter become apparent. More specifically, each side portion 3.47 preferably has a plurality of spaced apart apertures 3.49 through the lower edge or hem thereof. A grommet 3.51 is preferably attached to the cover means 3.43 about each aperture 3.49 for reinforcing the aperture 3.49, etc., as will now be apparent to those skilled in the art. The cover means 3.43 is specially designed for use with a combine harvester 13 of the type having a window W on the front or first wall member 21 of the extension wall 19 to allow the driver of the combine harvester 13 to look into the interior of the grain tank 15 from the cab 41 of the combine harvester 13 and/or for use with a combine harvester 13 of the type having a motor exhaust pipe P located in the interior of the grain tank 15 (see FIGS. 12 and 14). Such a combine harvester 13 may also include extensions E on the front and rear wall members 21, 29 of the extension wall 19 thereof as clearly shown in FIG. 12. The cover means 3.43 is movable between a fully closed position as shown in FIG. 13 in which the opened top 17 of the grain tank 15, the window W and the exhaust pipe P are completely covered; a fully opened position as shown in FIG. 12 in which the opened top 17 of the grain tank 15 is completely uncovered; and a partially opened, partially closed position as shown in FIG. 14 in which the opened top 17 of the grain tank 15 is partially uncovered and the window W and exhaust pipe P are uncovered. The partially opened, partially closed position is especially advantageous for combine harvesters 13 of the type having windows W to allow the driver of the combine harvester 13 to look into the interior of the grain tank 15 from the cab 41 and/or having the exhaust pipe P located in the interior of the grain tank 15. More specifically, it is beneficial to keep the cover means 3.43 closed while harvesting crops whenever there is a possibility of adverse weather or the like. However, with the cover means 3.43 in the fully closed position as shown in FIG. 13, the window W is at least partially blocked, thereby preventing the driver of the combine harvester 13 from looking into the interior of the grain tank 15 through the window W, and the exhaust pipe P is covered, thereby preventing exhaust from the motor of the combine harvester 13 from being properly vented and creating the danger that the cover means 3.43 will be burned by the hot exhaust fumes, etc. On the other hand, with the cover means 3.43 in the fully opened position as shown in FIG. 12, a sudden rain storm or the like might damage grain within the grain tank 15, etc. With the cover means 3.43 in the partially opened, partially closed position as shown in FIG. 14, both the window W and exhaust pipe P are uncovered yet a substantial portion (e.g., 75 per cent) of the opened top 17 of the grain tank 15 is closed to thereby provide substantial protection to the interior of the grain tank 15. It should be noted that the cover means 3.43 may include an elongated flap like the elongated flap 2.48 of the cover means 2.43 for extending over a portion of the combine harvester 13 adjacent the grain tank 15 as will now be apparent to those skilled in the art.

The cover apparatus 11 includes attachment means for attaching the respective cover means 43, 2.43, 3.43 to the combine harvester 13. The attachment means includes a plurality of bolt means 53 for bolting at least parts of the respective cover means 43, 2.43, 3.43 to the extension wall 19 of the grain tank 15. Each bolt means 53 preferably includes a bolt 55 having a head 57 for being positioned on the interior side of the extension wall 19 and a threaded stud 59 for extending through one of the wall members 21, 29, 37 of the extension wall 19 and through an aperture 49, 2.49, 3.49 in one of the side portions 47, 2.47, 3.47 of the respective cover means 43, 2.43, 3.43. Each bolt means 53 preferably includes a first nut 61 for being screwed onto the stud 57 and against the exterior side of the extension wall 19 to fixedly clamp the extension wall 19 between the head 57 of the bolt 55 and the first nut 61 as will now be apparent to those skilled in the art. The bolt means 53 preferably includes a second nut 63 for being screwed onto the stud 59 with the side portion 47, 2.47, 3.47 of a cover means 43, 2.43 positioned between the first and second nuts 61, 63 to fixedly clamp the cover means 43, 2.43, 3.43 to the extension wall 19 as will now be apparent to those skilled in the art. The second nut 63 preferably consists of a typical wing nut or the like to allow easy removal thereof as will not be apparent to those skilled in the art. Each bolt means 53 preferably includes a washer 65 for being positioned on the stud 59 between the second nut 53 and the side portion 47, 2.47, 3.47 of the respective cover means 43, 2.43, 343. The bolt 55, first nut 61, second nut 63, and washer 65 preferably consist of off-the-shelf components freely available in hardware stores and the like. The attachment means may also include one or more elongated cords 66 or the like having a first end for being secured to a respective cover means 43, 2.43, 3.43 and having a second end for being attached to some structure on the combine harvester 13 (e.g., the bottom edge 13' of the body of the combine harvester 13) as shown in FIG. 3. Each cord 66 may be elastic and have a hook at the first end thereof for being secured to one of the grommets 51, 2.51, 3.51 of a respective cover means 43, 2.43 3.43, and have a hook at the second end for being secured to the body, etc. of the combine harvester 13 to secure or help secure the respective cover means 43, 2.43, 3.43 to the combine harvester 13 as will now be apparent to those skilled in the art.

Figure 11:
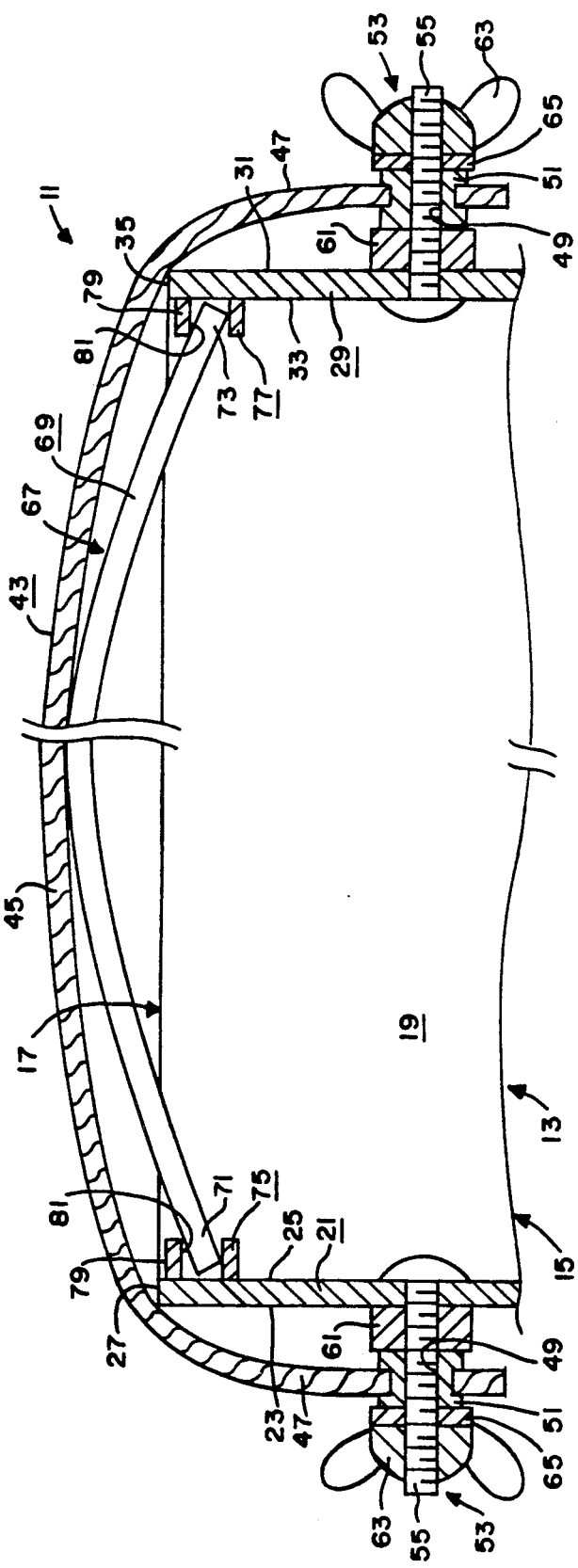
FIG. 11 is an enlarged sectional view substantially as taken on line 11—11 of FIG. 2.

The cover apparatus 11 preferably includes bow means 67 for being attached to the grain tank 15, for extending across the opened top 17 of the grain tank 15, and for supporting the top portion 45, 2.45, 3.45 of a respective cover means 43, 2.43, 3.43. The bow means 67 preferably includes an elongated, fiberglass bow member 69 having a first end 71 for being positioned adjacent the interior side 25 of the first wall member 21 of the extension wall 19 and having a second end 73 for being positioned adjacent the interior side 33 of the second wall member 29 of the extension wall 19. The bow means 67 preferably includes a first bracket means 75 for being attached to the interior side 25 of the first wall member 21 of the extension wall 19 adjacent the top end 27 thereof and for attaching the first end 71 of the bow member 69 thereto. The bow means 67 preferably includes a second bracket means 77 for being attached to the interior side 33 of the second wall member 29 of the extension wall 19 adjacent the top end 35 thereof and for attaching the second end 73 of the bow member 69 thereto. Each bracket means 75, 77 is preferably a mirror image of one another. Thus, each bracket means 75, 77 preferably includes a rigid socket member 79 having a main aperture 81 for receiving one of the ends 71, 73 of the bow member 69, and a pair of typical screws 83 or the like for attaching the socket member 79 to the extension wall 19 of the grain tank 15. The socket members 79 may be molded or otherwise manufactured out of metal. The length of the bow member 69, i.e., the distance between the first and second ends 71, 73 of the bow member 69, is preferably slightly greater than the distance between the interior sides 25, 33 of the first and second wall members 21, 29 of the extension wall 19 so that the bow member 69 will bow or curve upwardly when attached to the first and second wall members 21, 29 of the extension wall 19 as clearly shown in FIG. 11. For example, the length of the bow member 69 may be 3 inches longer than the maximum distance between the wall members 21, 29.

The cover apparatus 11 preferably includes tie means for securing a respective cover means 43, 2.43, 3.43 in an opened position. The tie means preferably includes a plurality of tie members 85 attached to the respective cover means 43, 2.43, 3.43 adjacent one end thereof for allowing the cover means 43, 2.43, 3.43 to be rolled or folded back from the opened top 17 of the grain tank 15 to the fully opened position and secured in a roll as clearly shown in FIG. 1 with respect to the cover means 43 and in FIG. 12 with respect to the cover means 3.43. Each tie member 85 may consist simply of a length of flexible rope or strap secured to one side portion 47, 2.47, 3.47 of each cover means 43, 2.43, 3.43 for being tied around the rolled cover means 43, 2.43, 3.43 as will now be apparent to those skilled in the art. The tie means preferably includes a plurality of tie members 3.85 attached to the cover means 3.43 intermediate the ends thereof as shown in FIG. 13 for allowing the cover means 3.43 to be rolled or folded back from one side of the opened top 17 of the grain tank 15 to the partially opened, partially closed position and secured in a roll as clearly shown in FIG. 14 to thereby expose the window W and/or the exhaust pipe P. Each tie member 3.85 may also consist simply of a length of flexible rope or strap secured to a midportion of the cover means 3.43 for being tied around the partially rolled cover means 3.43 as will now be apparent to those skilled in the art.

To install and use the cover assembly 11 of the present invention, the bracket means 75, 77 are mounted with the screws 83 in the center of the front and rear wall members 21, 29 of the extension wall 19 at the top end 27, 35 of each wall member 21, 29. This can be done by marking each wall member 21, 29 for two holes using a socket member 79 as a template, and then drilling two inch holes through each wall member 21, 29 at the marked locations. The socket members 79 can then be attached to interior sides 25, 33 of the respective wall members 21, 29 with the screws engaging the drilled holes as will now be apparent to those skilled in the art. The bow member 69 can then be inserted into the socket members 79. A cover means 43, 2.43, 3.43 is then placed over the opened top 17 of the grain tank 15 in the desired position and the extension wall 19 is marked at the proper location for the bolt means 53 using the grommets 51, 2.51, 3.51 of the respective cover means 43, 2.43, 3.43 as a template. Holes are then drilled through the extension wall 19 at each marked location, and a bolt 55 is inserted through each hole. Each bolt 55 is fixed in place using a first nut 61. The grommets 51, 2.51, 3.51 of a respective cover means 43, 2.43, 3.43 are then placed over the bolts 55, followed by the washers 65 and second nuts 63 to thereby secure the respective cover means 43, 2.43, 3.43 to the extension wall 19 of the grain tank 15. Anytime it is desired to fully uncover the opened top 17 of the grain tank 15, the respective cover means 43, 2.43, 3.43 can either be completely removed by unscrewing all of the second nuts 63, etc., as will now be apparent to those skilled in the art, or only the second nuts 63 around three sides of the extension wall 19 can be unscrewed and the cover means 43, 2.43, 3.43 can be rolled up and secured with the tie members 85 as clearly shown in FIGS. 1 and 12. The ends of the cover means 43, 2.43, 3.43 may be folded toward the center before the last roll as will now be apparent to those skilled in the art. Where it is desired to only uncover a portion of the grain tank 15 or related structure (such as where an exhaust discharge of the combine harvester 13 is located under the flap 2.48 of the cover means 2.43), the flap 2.48 can simply be folded back and secured in the folded back position using the cords 66 as clearly shown in FIG. 4. Anytime it is desired to move the cover means 3.43 to the partially opened, partially closed position as shown in FIG. 14 to expose the window W and/or exhaust pipe P, etc., the second nuts 63 along one end or side of the extension wall 19 and the along the proximate portion of the two adjacent sides of the extension wall 19 can be unscrewed and one end of the cover means 3.43 can be rolled up and secured with the tie members 3.85 as clearly shown in FIG. 14 and as will now be apparent to those skilled in the art.

Although the present invention has been described and illustrated with respect to preferred embodiments thereof and a preferred use therefor, it is not to be so limited since modifications and changes can be made therein which are within the full intended scope of the invention.

I claim:

1. A cover apparatus for use with a combine harvester of the type including a grain tank having an opened top, said cover apparatus comprising:
   a) cover means for covering said opened top of said grain tank; said cover means having a top portion for being positioned over said opened top of said grain tank;
   b) attachment means for attaching said cover means to said combine harvester; and c) bow means for extending across said opened top of said grain tank, and for supporting said top portion of said cover means.

2. A cover apparatus for use with a combine harvester of the type including a grain tank having an opened top and including an extension wall extending upward and defining said opened top, said cover apparatus comprising:
   a) cover means for covering said opened top of said grain tank; said cover means having a top portion for being positioned over said opened top of said grain tank and including side portions for being positioned over at least a portion of said extension wall of said grain tank; and
   b) attachment means for attaching said cover means to said combine harvester.

3. The cover apparatus of claim 2 in which is included bow means for being attached to said grain tank, for extending across said opened top of said grain tank, and for supporting said top portion of said cover means.

4. The cover apparatus of claim 3 in which said extension wall of said grain tank includes a first wall member having an exterior side, an interior side, and a top end: in which said extension wall of said grain tank includes a second wall member spaced from and positioned opposite said first wall member and having an exterior side, an interior side, and a top end; and in which said bow means includes a bow member having a first end for being positioned adjacent said interior side of said first wall member of said extension wall and having a second end for being positioned adjacent said interior side of said second wall member of said extension wall.

5. The cover apparatus of claim 4 in which said bow means includes a first bracket means for being attached to said interior side of said first wall member of said extension wall adjacent said top end thereof and for attaching said first end of said bow member thereto; and in which said bow means includes a second bracket means for being attached to said interior side of said second wall member of said extension wall adjacent said top end thereof and for attaching said second end of said bow member thereto.

6. The cover apparatus of claim 5 in which the distance between said first and second ends of said bow member is greater than the distance between said interior sides of said first and second wall members of said extension wall.

7. The cover apparatus of claim 6 in which said bow member is curved upwardly when attached to said first and second wall members of said extension wall.

8. The cover apparatus of claim 2 in which said attachment means includes a plurality of attachment members for attaching at least parts of said side portions of cover means to said extension wall.

9. The cover apparatus of claim 8 in which said extension wall of said grain tank includes an interior side and an exterior side; in which each of said attachment means includes a bolt having a head for being positioned on said interior side of said extension wall and a stud for extending through said extension wall and one of said side portions of said cover means, a first nut for being screwed onto said stud and against said exterior side of said extension wall and for fixedly clamping said extension wall between said head of said bolt and said first nut, and a second nut for being screwed onto said stud with said side portion of said cover means positioned between said first and second nuts and for fixedly clamping said side portion of said cover means between said first and second nuts.

10. The cover apparatus of claim 9 in which said side portions of said cover means has a plurality of apertures thereof for use in attaching said cover means to said combine harvester.

11. The cover apparatus of claim 10 in which said cover means includes a grommet for reinforcing each of said apertures through said side portions of said cover means.

12. The cover apparatus of claim 2 in which is included tie means attached to said cover means for allowing said cover means to be folded back from said opened top of said grain tank and secured in a roll.

13. The cover apparatus of claim 2 in which at least one of said side portions of said cover means includes an elongated flap for extending over a portion of said combine harvester adjacent said grain tank.

14. The combination with a combine harvester of a cover apparatus; said combine harvester including grain pickup means, a grain tank for receiving grain from said grain pickup means, and a grain unloading auger means for removing grain from said grain tank; said grain tank having an opened top and having an extension wall extending upward and defining said opened top; said extension wall including a first wall member having an exterior side, an interior side, and a top end and including a second wall member spaced from and positioned opposite said first wall member and having an exterior side, an interior side, and a top end; said cover apparatus comprising:
   a) a cover covering said opened top of said grain tank; said cover having a top portion for being positioned over said opened top of said grain tank and having side portions for being positioned over at least a portion of said extension wall of said grain tank;
   b) attachment structure attaching said cover to said combine harvester; and
   c) bow structure extending across said opened top of said grain tank and supporting said top portion of said cover; said bow structure including a bow member having a first end for being positioned adjacent said interior side of said first wall member of said extension wall and having a second end for being positioned adjacent said interior side of said second wall member of said extension wall; said bow means including a first bracket attached to said interior side of said first wall member of said extension wall adjacent said top end thereof and for attaching said first end of said bow member thereto; said bow structure including a second bracket attached to said interior side of said second wall member of said extension wall adjacent said top end thereof and for attaching said second end of said bow member thereto; the distance between said first and second ends of said bow member being greater than the distance between said interior sides of said first and second wall members of said extension wall.

15. A cover apparatus for use with a combine harvester of the type including a grain tank having an opened top, said cover apparatus comprising:
   a) cover means for movement between a fully closed position in which said opened top of said grain tank is completely covered, and an opened position in which said opened top of said grain tank is at least partially uncovered;

b) attachment means for attaching said cover means to said combine harvester; and c) tie means for securing said cover means in said opened position.

16. A cover apparatus for use with a combine harvester of the type including a grain tank having an opened top, said cover apparatus comprising:

a) cover means for movement between a fully closed position in which said opened top of said grain tank is completely covered, a fully opened position in which said opened top of said grain tank is completely uncovered, and a partially opened position in which said opened top of said grain tank is partially covered and partially uncovered;

b) attachment means for attaching said cover means to said combine harvester; and c) tie means for securing said cover means in either said fully opened position or said partially opened position.

17. The cover apparatus of claim 16 in which said cover means includes a first end and a second end, and in which said tie means includes a tie member attached to said cover means adjacent one of said ends thereof for securing said cover means in said fully opened position.

18. The cover apparatus of claim 16 in which said cover means includes a first end and a second end, and in which said tie means includes a tie member attached to said cover means intermediate said first and second ends thereof for securing said cover means in said partially opened position.

19. The cover apparatus of claim 16 in which said cover means includes a first end and a second end; in which said tie means includes a plurality of tie members attached to said cover means adjacent one of said ends thereof for securing said cover means in said fully opened position; and in which said tie means includes a plurality of tie members attached to said cover means intermediate said first and second ends thereof for securing said cover means in said partially opened position.

* * * * *